US010965662B2

(12) United States Patent
Arora et al.

(10) Patent No.: US 10,965,662 B2
(45) Date of Patent: Mar. 30, 2021

(54) METHOD AND SYSTEM FOR DATA COMMUNICATION AND FRICTIONLESS AUTHENTICATION

(71) Applicant: Bank of America Corporation, Charlotte, NC (US)

(72) Inventors: Ashish Arora, Issaquah, WA (US); Jothimuthu Palanisamy, Bothell, WA (US); Andrew T. Keys, Albany, OR (US); Michael E. Toth, Charlotte, NC (US); Daniel L. Carpenter, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 187 days.

(21) Appl. No.: 16/019,775

(22) Filed: Jun. 27, 2018

(65) Prior Publication Data
US 2020/0007528 A1    Jan. 2, 2020

(51) Int. Cl.
*H04L 29/06* (2006.01)
*H04W 12/06* (2021.01)
*H04L 9/32* (2006.01)

(52) U.S. Cl.
CPC ........ *H04L 63/0807* (2013.01); *H04L 9/3213* (2013.01); *H04L 9/3231* (2013.01); *H04L 63/0861* (2013.01); *H04W 12/06* (2013.01)

(58) Field of Classification Search
CPC . H04L 63/0807; H04L 9/3213; H04L 9/3231; H04L 63/0861; H04W 12/06
See application file for complete search history.

(56) References Cited

U.S. PATENT DOCUMENTS

| | | | |
|---|---|---|---|
| 6,104,712 A | 8/2000 | Robert et al. | |
| 9,418,358 B2 | 8/2016 | Johnson et al. | |
| 9,646,304 B2 | 5/2017 | Mann, III et al. | |
| 9,836,741 B2 | 12/2017 | Varadarajan et al. | |
| 2011/0238573 A1 | 9/2011 | Varadarajan | |
| 2013/0042314 A1* | 2/2013 | Kelley | H04L 9/3215 726/9 |
| 2013/0103482 A1 | 4/2013 | Song et al. | |

(Continued)

FOREIGN PATENT DOCUMENTS

WO    2016100965 A1    6/2016

*Primary Examiner* — Ayoub Alata
(74) *Attorney, Agent, or Firm* — Banner & Witcoff, Ltd.; Michael A. Springs

(57) ABSTRACT

Aspects of the present disclosure are directed to electronic computer implemented methods of data communication. At least one method includes, via a data communications network, receiving one or more mobile EDI token datasets associated with each of one or more mobile devices; each of the mobile EDI token datasets including a mobile online ID attribute data element, a beacon attribute data element and biometric ID attribute data element; via a data communications network, receiving a matching score attribute data element associated with at least one of the mobile EDI token datasets; electronically processing and authenticating the least one mobile EDI token dataset based on the received matching score attribute data element; and via a data communications network, transmitting the mobile online ID attribute associated with the authenticated mobile EDI token dataset.

12 Claims, 5 Drawing Sheets

(56) References Cited

U.S. PATENT DOCUMENTS

| | | |
|---|---|---|
| 2014/0025958 A1* | 1/2014 | Calman .................. G06F 21/33 |
| | | 713/189 |
| 2014/0115492 A1 | 4/2014 | Tehranchi et al. |
| 2015/0109428 A1 | 4/2015 | Mechaley, Jr. |
| 2015/0195334 A1 | 7/2015 | Chew |
| 2015/0287018 A1 | 10/2015 | Iqbal et al. |
| 2016/0260094 A1 | 9/2016 | Jia |
| 2016/0321627 A1 | 11/2016 | McCracken et al. |
| 2017/0109718 A1 | 4/2017 | Raja et al. |
| 2017/0161747 A1* | 6/2017 | Einhorn ............. G06Q 20/4016 |
| 2017/0344997 A1 | 11/2017 | Pattanayak |
| 2018/0007059 A1* | 1/2018 | Innes .................... H04L 63/107 |
| 2018/0293584 A1* | 10/2018 | Maheshwari ...... G06Q 20/3224 |
| 2019/0340620 A1* | 11/2019 | Sheets .................... G06Q 20/20 |
| 2019/0354660 A1* | 11/2019 | Fong ....................... G06F 21/32 |

* cited by examiner

METHOD AND SYSTEM FOR DATA COMMUNICATION AND FRICTIONLESS AUTHENTICATION

BACKGROUND

Moore's law predicted that the number of transistors on a computer chip would double every two years while the chip's price would remain constant. "Moore's law" meant consumers could buy the same technology two years later for about the same price. Fifty years later, Moore's law prediction has endured to the idea that technology companies have recognized Moore's law as a benchmark they must meet, or fall behind in the market. Patrons have come to expect technological products to be faster, cheaper, and more compact over time. This expectation seems to have driven trends of rapid growth in computing power, smaller devices, the ability to connect to the Internet, and reduction in cost and big data. There is a need to improve the technological processing in the new computing era.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure are directed to electronic computer implemented methods of data communication and frictionless authentication. At least one method includes, via a data communications network, receiving one or more mobile EDI token datasets associated with each of one or more mobile devices; each of the mobile EDI token datasets including a mobile online ID attribute data element, a beacon attribute data element and behavioral score attribute data element. Next, via a data communications network, the method includes receiving a matching score attribute data element associated with at least one of the mobile EDI token datasets. The method includes electronically processing and authenticating the least one mobile EDI token dataset based on the received matching score attribute data element; and via a data communications network, transmitting the mobile online ID attribute associated with the authenticated mobile EDI token dataset.

Aspects of the present disclosure are directed to electronic computer implemented methods of data communication and frictionless authentication. At least one method includes, via a data communications network, receiving one or more mobile EDI token datasets associated with each of one or more mobile devices; each of the mobile EDI token datasets including a mobile online ID attribute data element, a beacon attribute data element and biometric ID attribute data element; via a data communications network, receiving a matching score attribute data element associated with at least one of the mobile EDI token datasets; electronically processing and authenticating the least one mobile EDI token dataset based on the received matching score attribute data element; and via a data communications network, transmitting the mobile online ID attribute associated with the authenticated mobile EDI token dataset.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
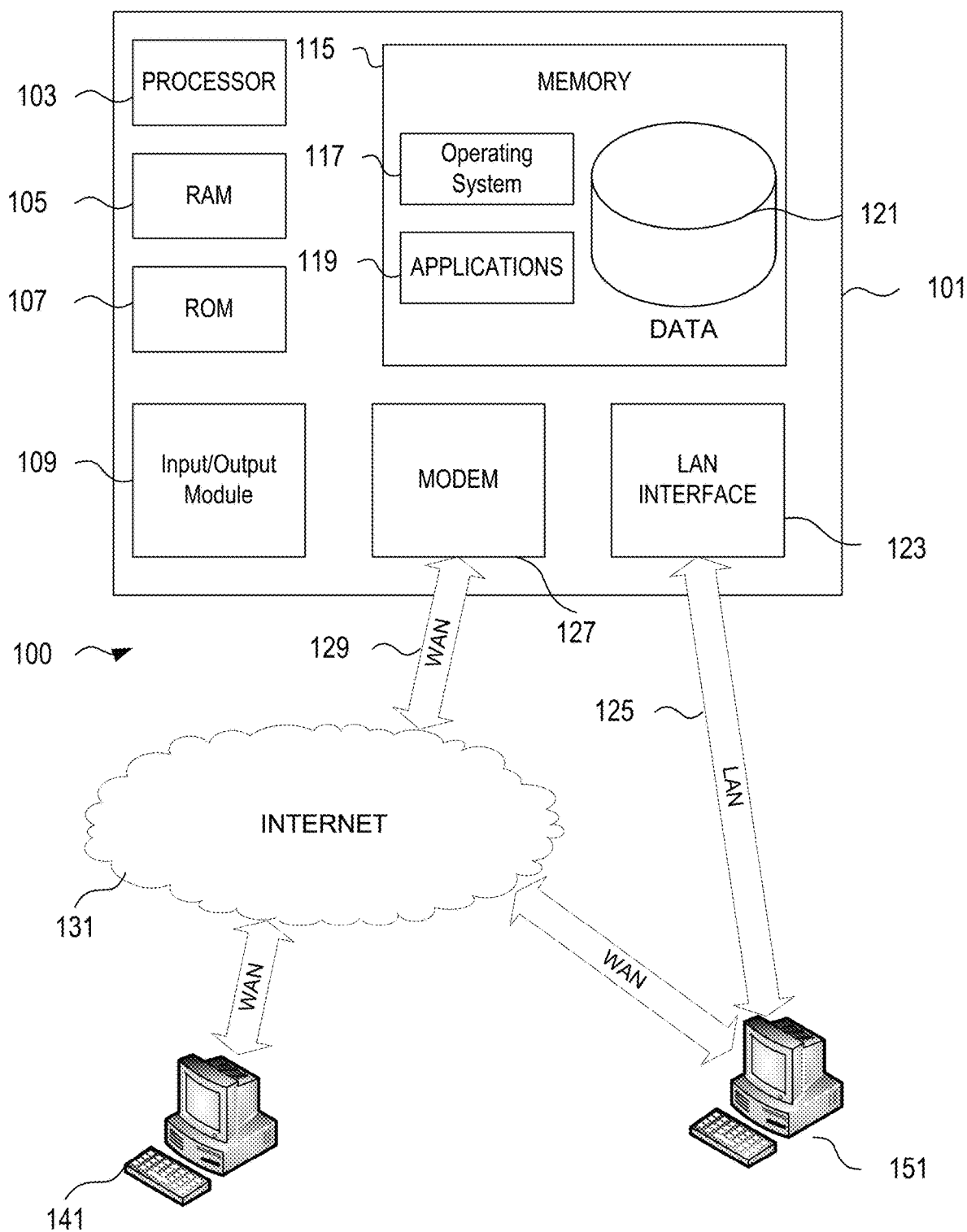
FIG. 1 illustrates a schematic diagram of a digital computing environment in which certain aspects of the present disclosure may be implemented.

FIG. 1 illustrates a block diagram of an specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151. The terminals 141 and 151 may be personal computers or servers that include many or all of the elements described above relative to the server

101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
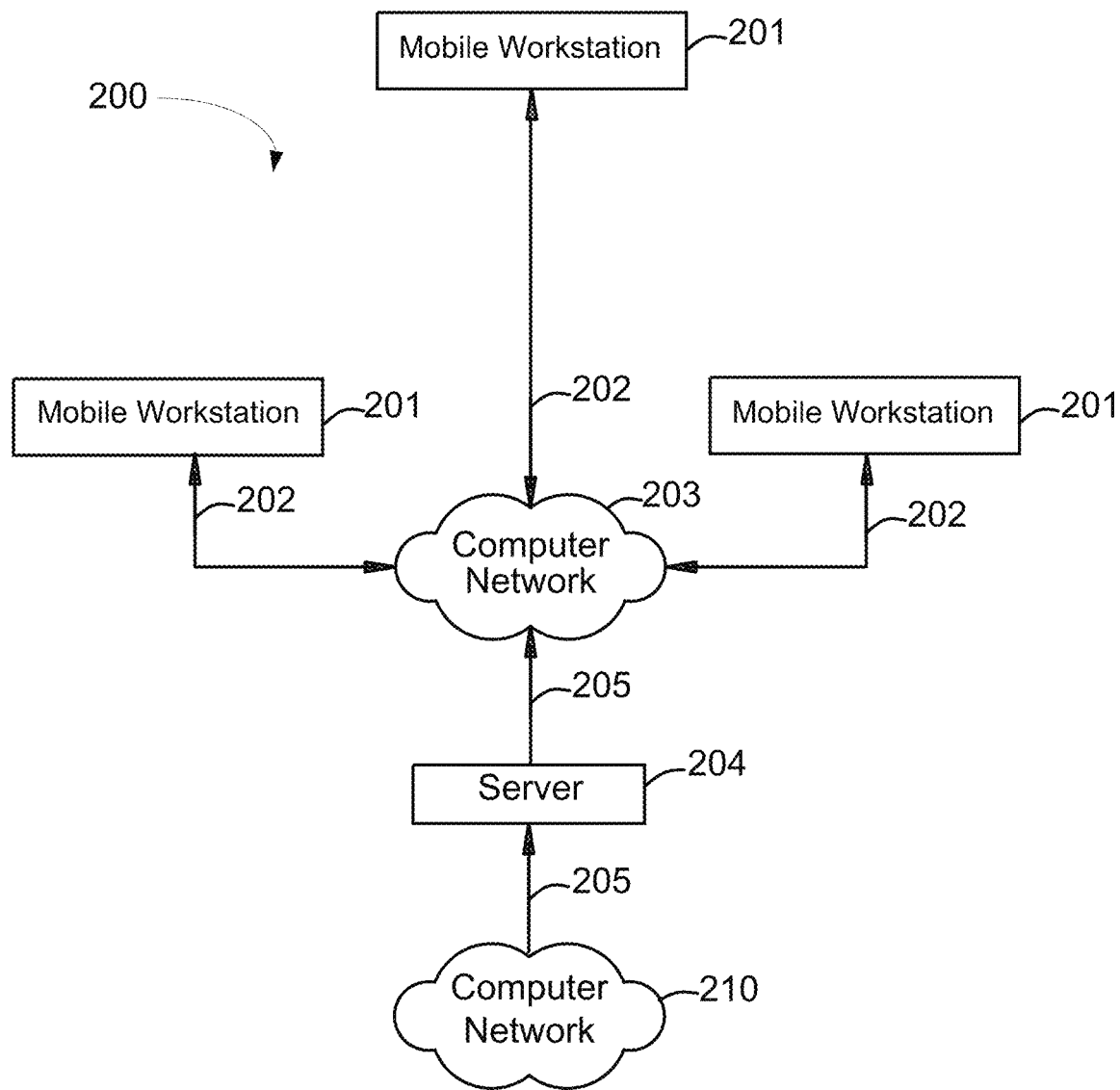
FIG. 2 is an illustrative block diagram of mobile workstations and stationary workstations and servers that may be used to implement the processes and functions of certain embodiments of the present disclosure.

Referring to FIG. 2, an illustrative system 200 for implementing methods according to the present disclosure is shown. As illustrated, system 200 may include one or more mobile workstations 201. Mobile workstations 201 may be local or remote, and are connected by one or more communications links 202 to computer networks 203, 210 that is linked via communications links 205 to server 204. In system 200, server 204 may be any suitable server, processor, computer, or data processing device, or combination of the same. Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3A:
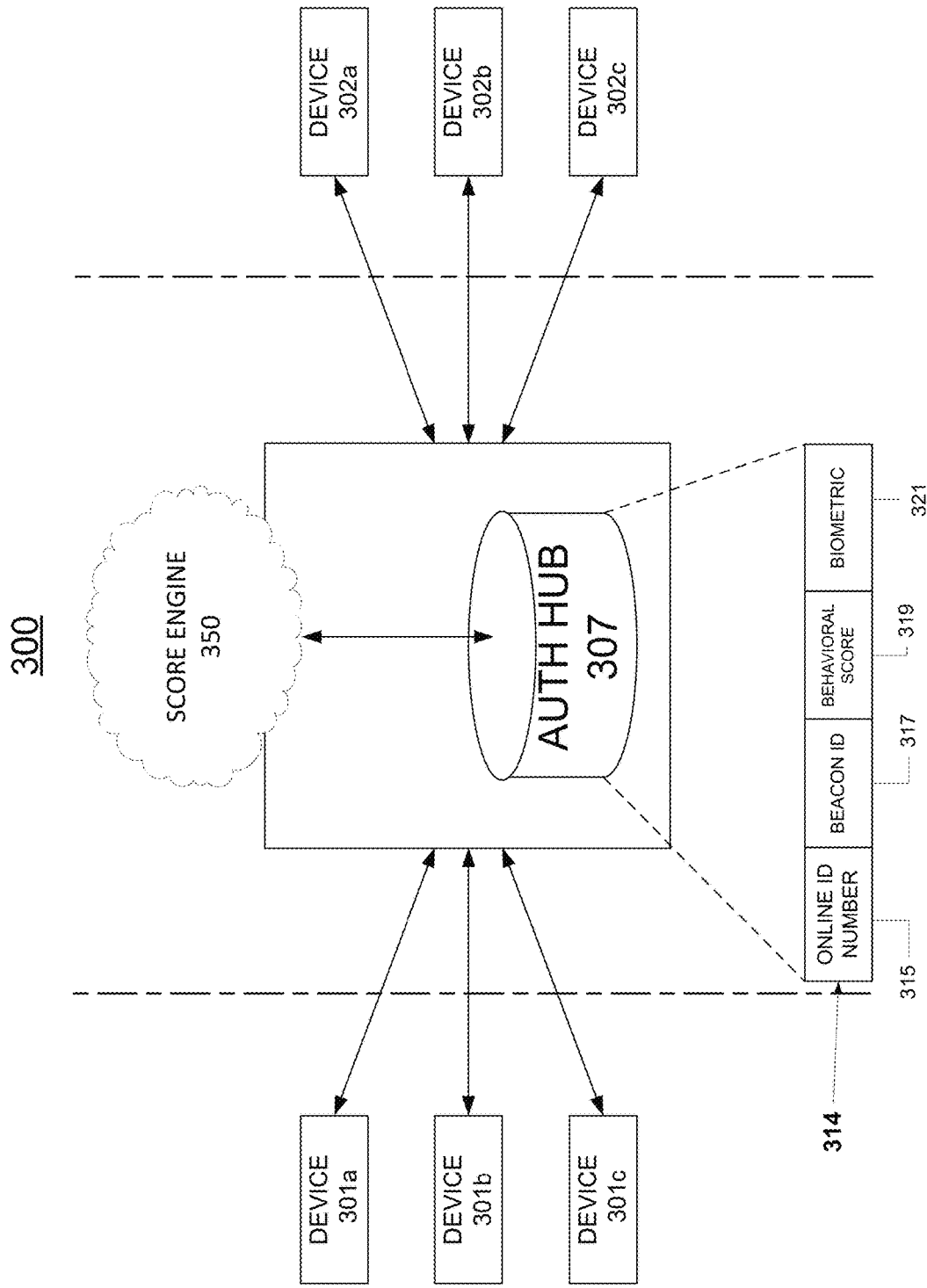
FIGS. 3A-3B are an illustrative functional block diagram of workstations, database and servers that may be used to implement the processes and functions of certain embodiments.
Figure 3B:
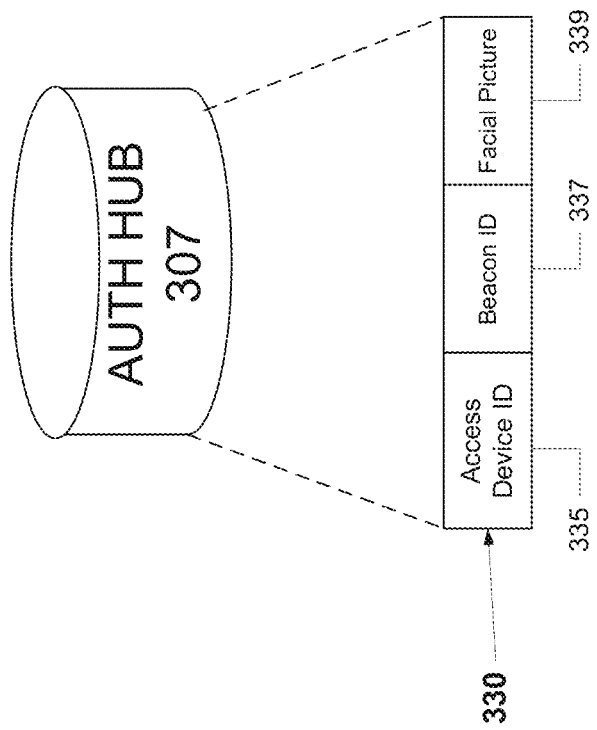

FIG. 3A-3B illustrate an example of representative infrastructure according to some embodiments in the disclosure. The different user devices 301a-301c, via mobile workstations, electronically communicates with a plurality of different user devices 302a-302c (as such, stationary access points or mobile access devices), through the cloud-based processing system 300 including computer network 203, server 204 and electronic authentication hub 307. In one embodiment, users execute commands with terminals/workstations to exchange information with the processing system 300. These mobile workstations may be standard smart phones as are known in the art. In alternative embodiments, the users may use hand-held, tablet computers or other portable electronic devices, such as a wearable device, as known in the art to communicate with the system 300.

The system 300 includes, for example and without limitation, server 305. Server 305 may include a messaging server, which may be used to receive and send data via email or over the Internet 131 or other a private virtual network. The system 300 may use various attribute data in the Electronic Data Interchange (EDI) format for electronic tracking of specific data as discussed in the foregoing. Server 204 can process an EDI messages sent through the processing system 300 to improve computer processing and multi-factor authentication functionality to thereby bring new tangible improved functions to the technology area. A user with device 301a-301c may securely register to system 300 via a website URL registration service, an in-person registration service, a mail-in registration service, and/or some other registration service.

According to some aspects of the disclosure, a network processing system 300 provides various users efficiency data communication tracking and delivery of data for multi-factor authentication based on data obtained from Device 301a-301c. In one example, device 301a may include an online ID, location or global position system electronics/software, and behavioral/gating electronics/software. In one construction, a biometric device system located in Device 301a-301c may be included to enable for securely storing in the device biometric data unique to the user, and/or securely storing in the device behavioral/gating data associated with the user. The electronic biometric data and behavioral/gating data can be maintained, or otherwise stored within a memory/database, such as memory 115 and/or RAM 105 as shown in FIG. 1 in which memory in located within the device (e.g., smart phones). The electronic biometric data could be determined via scanning of an iris of the user, retina scan, face recognition, faceprint and/or other types of biometric identification and authentication, including fingerprint scan analysis. In one embodiment, a user provides a picture to a mobile application, such as self-picture taken on the mobile device. This picture is processed and a biometric template of facial characteristics ("faceprint") is stored securely in the mobile application device.

The electronic behavioral/gating score data can be developed from a number of characteristics, including but not limited to user touch dynamics (e.g., screen swiping behavior), and user walking/running gait. For the user walking/running gait data, the Device 301a-301c may have on-board one of more accelerometer devices that sends data to the electronic behavioral/gaiting score software program ("behavioral scoring program"). For authentication use, the behavioral scoring program may create a baseline of the user's electronic behavioral/gaiting data over a threshold period of operation for Device 301a-301c, such as 12 hours, 24 hours, two-four days, one week, or two to three weeks or more. This electronic baseline data can be stored in the Device 301a-301c in memory as discussed. In one construction, this electronic baseline behavioral data may be periodically transmitted to a cloud-based behavioral Score Engine 350 for later use for authentication according to the teachings of the present disclosure. Additionally, behavioral scoring program may operate in real-time to create an electronic temporary behavioral data for a period of several minutes of operation. This temporary behavioral data can be designated as recent behavior data for authentication use according to the teachings of the present disclosure.

FIGS. 3A-3B are merely illustrative and the number of, users and/or user terminals, servers and databases is not in any way limited. Furthermore, although various embodiments are described in the context of a single system, one of ordinary skill in the art may appreciate that the described functionality may be implemented across multiple systems. Moreover, a web site may be mirrored at additional systems in the network and, if desired, one or more management systems or other computer resources may be used to facilitate various functions.

The system 300 can provide messages in the communication cycle in a secure format for each user that is pre-authorized. In one example, an IPSEC circuit is commonly to pertain to IP Security, a set of protocols to support secure exchange of packet at the IP layer in a TCP/IP network system. IPSEC systems have been deployed widely to implement Virtual Private Networks (VPNs). Under an IPSEC system, at least two encryption modes are supported: Transport and Tunnel. Transport mode encrypts only the token portion of each packet, but leaves the header. The Tunnel mode encrypts both the header and the token. On the receiving side, an IPSEC-compliant device decrypts each packet. The methods and features recited herein further may be implemented through any number of non-transitory computer readable media that are able to store computer readable instructions. Examples of non-transitory computer readable media that may be used include RAM, ROM, EEPROM, flash memory or other memory technology, CD-ROM, DVD, or other optical disc storage, magnetic cassettes, magnetic tape, magnetic storage and the like.

Referring to FIGS. 3A-3B, in one aspect, system 300 may use various attribute data in the Electronic Data Interchange (EDI) format for a tokenized data form. In one implementation, the EDI message can use, for example, IPSEC circuitry for secure encrypted communications. The EDI messages can be electronically processed according any number of formats and data sequences. In one case, the EDI format and token for each mobile device, may include an online ID number attribute 315, a beacon/location attribute 317, a behavioral score attribute 319, a biometric data attribute data 321. The online ID number attribute pertains to the specific user device 301a-301c. The beacon/location ID attribute data 317 pertains to a determined location, such as beacon locations 1 through 3 in FIG. 4 and may include longitude and latitude of the location to linked to a mapping application or maybe locations within a building structure. In one construction, the beacon ID attribute data pertains to an iBeacon compatible device, which uses the iBeacon protocol as commonly known. Devices 301a-301c may be iBeacon enabled compatible devices having low-energy Bluetooth technology in which the location of the receiving device (e.g., smart phone) may be triggered into action via a mobile application when the device is in physical proximity to a "beacon". The Devices 301a-301c receives the specific beacon ID from the iBeacon location.

Biometric ID data attribute data 321 pertains to user biometric information (such as faceprint of the user). In the EDI token, the "attribute data" may include ASCII characters in computer readable form or binary complied data, such as biometric data. The ASCII characters or binary data can be manipulated in the software of system 300.

Figure 4:
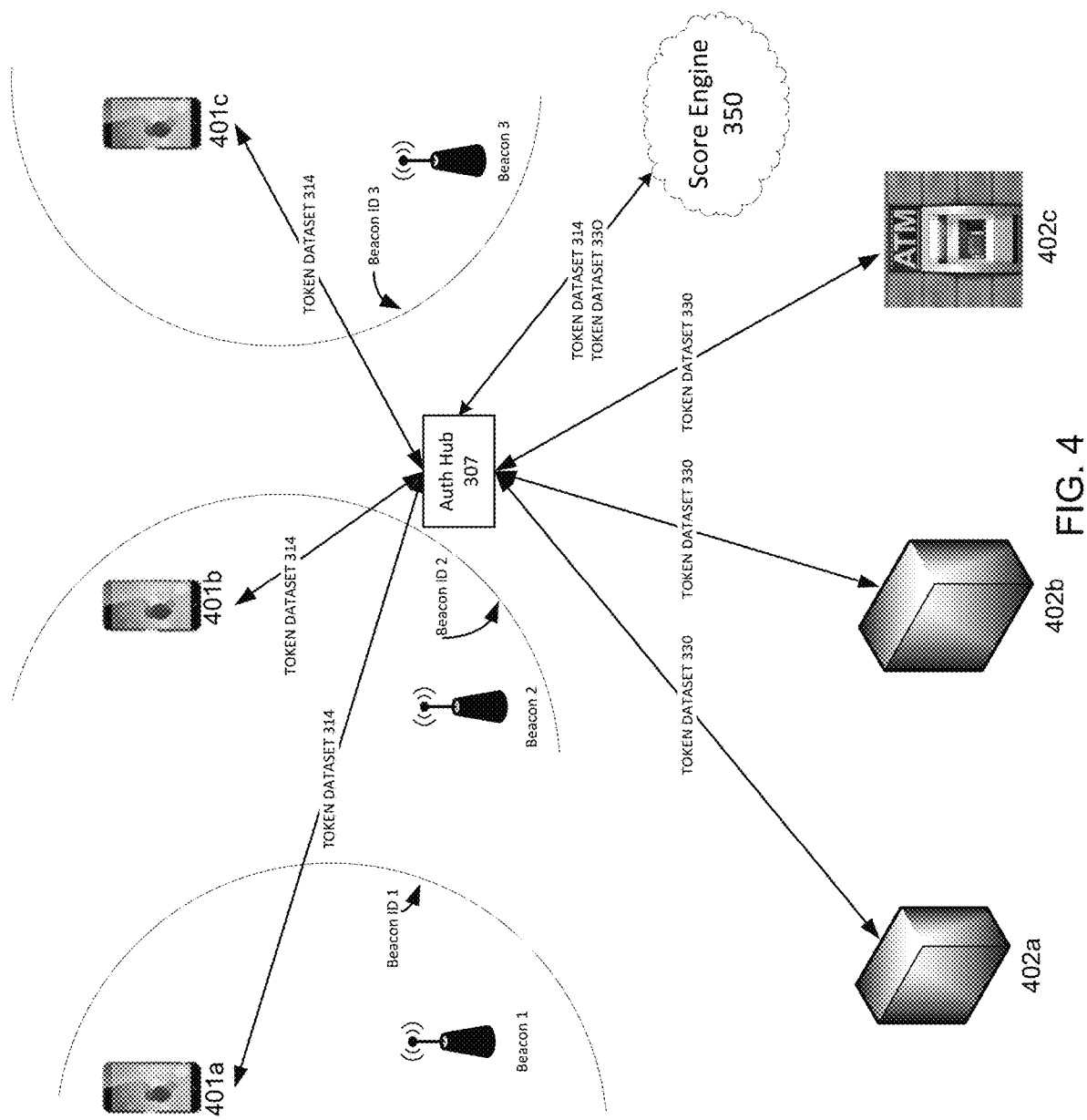
FIG. 4 is an illustrative functional block diagram for in accordance with at least one aspect of the present disclosure.

The steps that follow in the FIG. 4 may be implemented by one or more of the components in FIGS. 1, 2 and 3A-3B and/or other components, including other computing devices. Referring to FIG. 4, in a general overview, system 300 electronically receives a plurality of electronic EDI tokens that may be cached and associated in a computer readable authentication hub 307. In such an example, the separate EDI tokens 314 may be stored within a non-transitory computer readable memory/database, such as memory 115 and/or RAM 105 in FIG. 1 or Hub 307 of FIGS. 3A-3B. A user with device 401a-401c electronically communicates with system 300 and devices 402a-402c via system 300.

The steps that follow in FIG. 4 can be implemented to include a computer readable transaction history or log of the status within process flows that can be maintained or otherwise stored within a memory/database, such as memory 115 and/or RAM 105 in FIG. 1 or Auth Hub 307 of FIGS. 3A-3B. Referring to FIG. 4 process flow of system 300 are electronic logically via computer readable instructions linked to electronic attribute data for EDI token processing via system 300. A user travels with mobile phone device 401a-401c and the devices communicate with processing system 300 in the background as discussed in the foregoing. The system 300 may employ selective attribute data in the Electronic Data Interchange (EDI) format to a tokenized data form for electronic transfer. In Step S0, iBeacon signals the Device 401a-401c mobile application to "wake up" to initiate an action. iBeacon transmits a beacon ID to the mobile application of Device 301a-301c. In Step S1, in one example, Device 401a-401c requests and obtains the previously transmitted behavior score attribute data from the Behavior Scoring Engine 350. This step may be implemented under the EDI token processing in which the baseline behavior score attribute 319 in transmitted to device 401a-401c based on the online ID attribute unique to the device. Processing flows to Step S2, a virtual dataset record 314 is created in the memory/database of authentication hub 307 with at least an online ID number 315, beacon/location ID attribute 317, a baseline behavior score 319, and a biometric ID attribute 321. The virtual dataset record 314 is transmitted from the associated Device 401a-401c to the Authentication Hub 307 via the network.

In Step S3, a user travels with mobile phone device 401a-401c to devices 402a, 402b, or 403c. For ease of explanation, mobile phone device 401a becomes in the proximity of Device 402c. It should be noted while Devices 402a-402c are embodied in one construction as self-service kiosk systems with a camera, such as an automated teller machine (ATM), the Devices 402a-402b can be embodied in access point device systems with a camera, such as security entry doors, vaults, computer workstations in which electronic access may be granted. In Step S4, Device 402c captures a facial picture of the user of the device 401a (e.g., mobile phone) in physical proximity, then Device 402c transmits the Access Device ID 335, Beacon ID 337 for the Device 402c, and the facial picture 339 to the Auth Hub 307. This EDI token dataset 330 is shown in FIG. 3B and is transmitted via the network.

In Step S5, Auth Hub 307 sends the mobile dataset 314 for each device 401a-401c and the access device dataset 330 from the Device 402a-402c to Score Engine 350. In Step S5, the Score Engine 350 uses the facial picture 339 from the Device 402c to create a biometric face template. Subsequently, Score Engine 305 initiates a process to find a match to the facial template 339 to each of the face prints templates (e.g., biometric ID attribute 323 (from dataset 314) and behavioral score 319 from dataset 314 included in the Auth Hub 307 request. A match score, based on a biometric matching of the face print 323 process in Score Engine 350, is transmitted back to the Auth Hub 307 for each mobile dataset 314 provided in the request. Subsequently, Score Engine 350 initiates a process to find a match to the facial template 339 to each of the face prints templates (e.g., biometric ID attribute 323 from dataset 314) included in the Auth Hub 307 request. A match score, based on a biometric matching of the face print 323 process in Score Engine 305, is transmitted back to the Auth Hub 307 for each mobile dataset 314 provided in the request. Alternatively, in Step S5, the baseline behavioral scores for each user device 401a-401c are saved in the Score Engine 350 as they are previously transmitted by device 401a-401c. In this alternative process, Score Engine 350 may initiate a process to find a match to the facial template 339 to each of the face prints templates 323 and recent behavioral score 319 from dataset 314 included in the Auth Hub 307 request. A match score, based on a biometric matching of the face print 323 and behavior score 319 process in Score Engine 350, is transmitted back to the Auth Hub 307 for each mobile dataset 314 provided in the request.

The process flows for Step S5, so that in Step S6, Auth Hub 307 processes the match score to determine which person is using the Device 401a is in front of the Device 402c (as such as an ATM). In Step S7, Auth Hub 307 responds/transmits to the Device 401c with the online ID associated with the user of Device 401a. In Step S8, the Device 402c initiates an authenticated session for that online ID, such as user may proceed and is granted access without the need to input/type codes at the device 402c.

In one alternative construction, the steps in the FIG. 4 can be implemented where the mobile devices can receive inquiries, via an automatic push notification or a report that sends to the authorized inquirer an electronic mail, text messaging via Short Messaging Service (SMS) component of phone, web, or mobile communication systems, using standardized communication protocols that allow the exchange of short text messages between fixed line or mobile phone devices. In another manner, the mobile device receive inquiries via a pull format where the inquirer initiates the query at various steps and the notification can be electronic mail or Short Messaging Service technology for cellular phones.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

The invention claimed is:

1. An electronic computer implemented method of data communication, comprising:
via a data communications network, receiving one or more mobile Electronic Data Interchange (ED) token datasets associated with one or more mobile devices; the one or more mobile EDI token datasets including a mobile online ID attribute data element, a beacon attribute data element and a behavioral score attribute data element;
via a data communications network, receiving a matching score attribute data element associated with at least one of the mobile EDI token datasets;
electronically processing and authenticating the least one mobile EDI token dataset based on the received matching score attribute data element; and
via a data communications network, transmitting the mobile online ID attribute associated with the authenticated least one mobile EDI token dataset.

2. The method of claim 1, further comprising a step of receiving a biometric ID attribute data element associated with the mobile online ID attribute, prior to the step of authenticating.

3. The method of claim 1, further comprising a step of receiving an EDI token dataset associated with an electronic device in close proximity to the one or more mobile devices; the EDI token dataset includes an access device ID attribute data element, a beacon ID attribute data element, and a biometric photo attribute data element.

4. The method of claim 2, wherein the biometric ID attribute data element comprises a face print.

5. One or more non-transitory computer readable media storing computer executable instructions that, when executed by at least one processor, cause the at least one processor to perform a data communication method, comprising:
via a data communications network, receiving one or more mobile Electronic Data Interchange (ED) token datasets associated with each of one or more mobile devices; the one or more mobile EDI token datasets including a mobile online ID attribute data element, a beacon attribute data element and a behavioral score attribute data element;
via a data communications network, receiving a matching score attribute data element associated with at least one of the mobile EDI token datasets;
electronically processing and authenticating the least one mobile EDI token dataset based on the received matching score attribute data element; and
via a data communications network, transmitting the mobile online ID attribute associated with the authenticated the least one mobile EDI token dataset.

6. The one or more non-transitory computer readable media of claim 5, further comprising receiving a biometric ID attribute data element associated with the mobile online ID attribute, prior to the step of authenticating.

7. The one or more non-transitory computer readable media of claim 5, further comprising receiving an EDI token dataset associated with an electronic device in close proximity to the one or more mobile devices; the EDI token dataset includes an access device ID attribute data element, a beacon ID attribute data elements, and a biometric photo attribute data element.

8. The one or more non-transitory computer readable media of claim 6, wherein the biometric ID attribute data element comprises a face print.

9. An electronic computer implemented method of data communication, comprising:
via a data communications network, receiving one or more mobile Electronic Data Interchange (EDI) token datasets associated with each of one or more mobile devices; the one or more mobile EDI token datasets including a mobile online ID attribute data element, a beacon attribute data element and biometric ID attribute data element;

via a data communications network, receiving a matching score attribute data element associated with at least one of the mobile EDI token datasets;

electronically processing and authenticating the least one mobile EDI token dataset based on the received matching score attribute data element; and via a data communications network, transmitting the mobile online ID attribute associated with the authenticated least one mobile EDI token dataset.

10. The method of claim 9, further comprising a step of receiving a gaiting score attribute data element associated with the mobile online ID attribute, prior to the step of authenticating.

11. The method of claim 9, further comprising a step of receiving an EDI token dataset associated with an electronic device in close proximity to the one or more mobile devices; the EDI token dataset includes an access device ID attribute data element, a beacon ID attribute data elements, and a biometric photo attribute data element.

12. The method of claim 9, wherein the biometric ID attribute data element comprises a face print.

* * * * *

UNITED STATES PATENT AND TRADEMARK OFFICE
CERTIFICATE OF CORRECTION

PATENT NO. : 10,965,662 B2  
APPLICATION NO. : 16/019775  
DATED : March 30, 2021  
INVENTOR(S) : Arora et al.

Page 1 of 1

It is certified that error appears in the above-identified patent and that said Letters Patent is hereby corrected as shown below:

In the Claims

Column 8, Claim 5, Line 31:
Delete "(ED)" and insert --(EDI)--

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*